Figure 1:
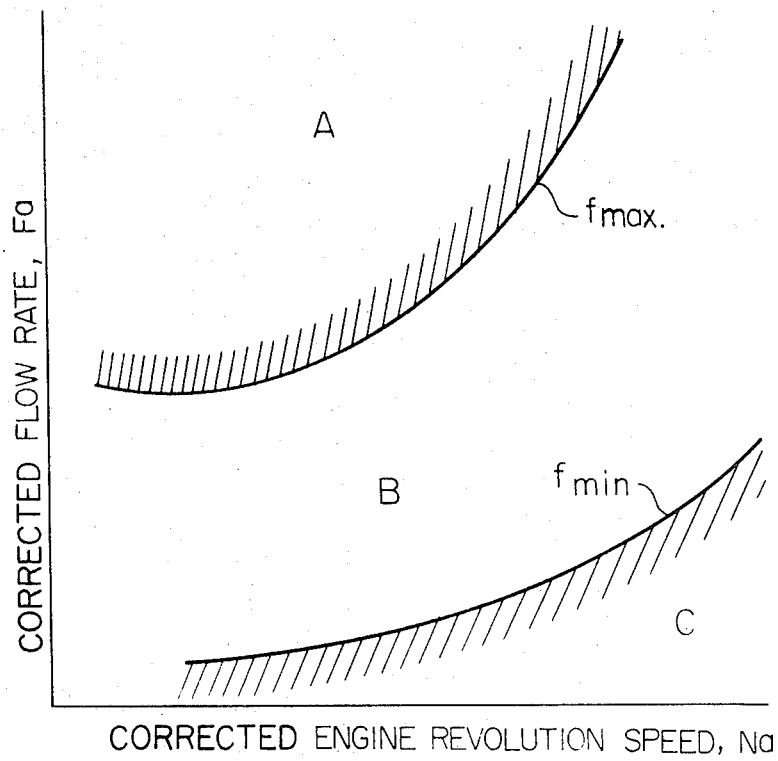

United States Patent [19]

Kubota et al.

[11] 3,772,880

[45] Nov. 20, 1973

[54] METHOD AND APPARATUS FOR REGULATING FUEL FLOW OF A GAS TURBINE ENGINE

[75] Inventors: Seishi Kubota, Yokosuka; Takashi Kunugi, Yokohama, both of Japan

[73] Assignee: Nissan Motor Company, Limited, Yokohama City, Japan

[22] Filed: July 23, 1971

[21] Appl. No.: 165,050

[30] Foreign Application Priority Data

Sept. 14, 1970 Japan.............................. 45/80652

[52] U.S. Cl. ......................... 60/39.02, 60/39.28 R
[51] Int. Cl. ............................................. F02c 9/05
[58] Field of Search .................. 60/39.28 T, 39.02, 60/39.03, 39.28 R

[56] References Cited

UNITED STATES PATENTS

| | | | |
|---|---|---|---|
| 3,076,312 | 2/1963 | Haigh | 60/39.28 T |
| 2,948,114 | 8/1960 | Beslier | 60/39.28 T |
| 3,046,739 | 7/1962 | Dahl | 60/39.28 T |
| 3,139,727 | 7/1964 | Torell | 60/39.28 T |

*Primary Examiner*—Clarence R. Gordon
*Attorney*—Robert E. Burns et al.

[57] ABSTRACT

A method and an apparatus for regulating a flow rate of a fuel to be supplied to a gas turbine engine, the fuel flow rate being regulated in accordance with an atmospheric pressure, an atmospheric temperature and a revolution speed of the engine for preventing the engine from misfiring and surging otherwise occurring due to inappropriate supply of fuel to the engine.

3 Claims, 4 Drawing Figures

METHOD AND APPARATUS FOR REGULATING FUEL FLOW OF A GAS TURBINE ENGINE

This invention relates to a gas turbine engine and, more particularly, to a method and an apparatus for regulating the flow of a fuel to the turbine engine during varying engine operations.

Experiments reveal that the performance of the gas turbine engine varies markedly depending upon the variations in an atmospheric pressure, atmospheric temperature and revolution speed of the engine. If the supply of the fuel to the engine is excessive for the engine revolution speed at given atmospheric pressure and temperature, then the engine is liable to cause surging and, if the supply of the fuel is insufficient, then the engine tends to cause misfiring. To prevent the engine from misfiring and surging, it is therefore necessary to have the flow rate of the fuel to the engine regulated to be maintained within a certain range in accordance with the atmospheric temperature, atmospheric pressure and revolution speed of the engine.

It is accordingly an important object of this invention to provide a method for regulating the flow rate of the fuel to the gas turbine engine with use of an electric arrangement thereby to constantly maintain the flow rate within a predetermined range in which the engine is prevented from misfiring and surging.

To achieve these and other objects, this invention proposes to establish signals representing upper and lower limits of a range of an acceptable working fuel flow rate determined from the atmospheric pressure, atmospheric temperature and revolution speed of the engine. These signals are then compared with a signal which is substantially proportional to the flow rate of the fuel being supplied to the engine. If it is indicated through such comparison that the working fuel flow rate falls outside the range of the acceptable flow rate, then a signal is produced to regulate the working flow rate so as to eliminate a difference between the flow rate of the working fluid and the upper or lower limit of the range of the acceptable flow rate. If, on the other hand, it is found that the working flow rate lies within the range of the acceptable flow rate, then a signal is produced so that the working fuel flow rate approaches a desired level which is determined by a selected position of an accelerator pedal.

This invention therefore proposes to regulate the rate of supply of the fuel to the engine in a manner such that the working fuel flow rate is constantly maintained within a predetermined range which is higher than the misfiring range and lower than the surging range. This is advantageously achieved by regulating the fuel flow rate in accordance with the detected atmospheric pressure and temperature at varying engine revolution speeds which are adjusted in accordance with the atmospheric temperature.

Figure 2A:
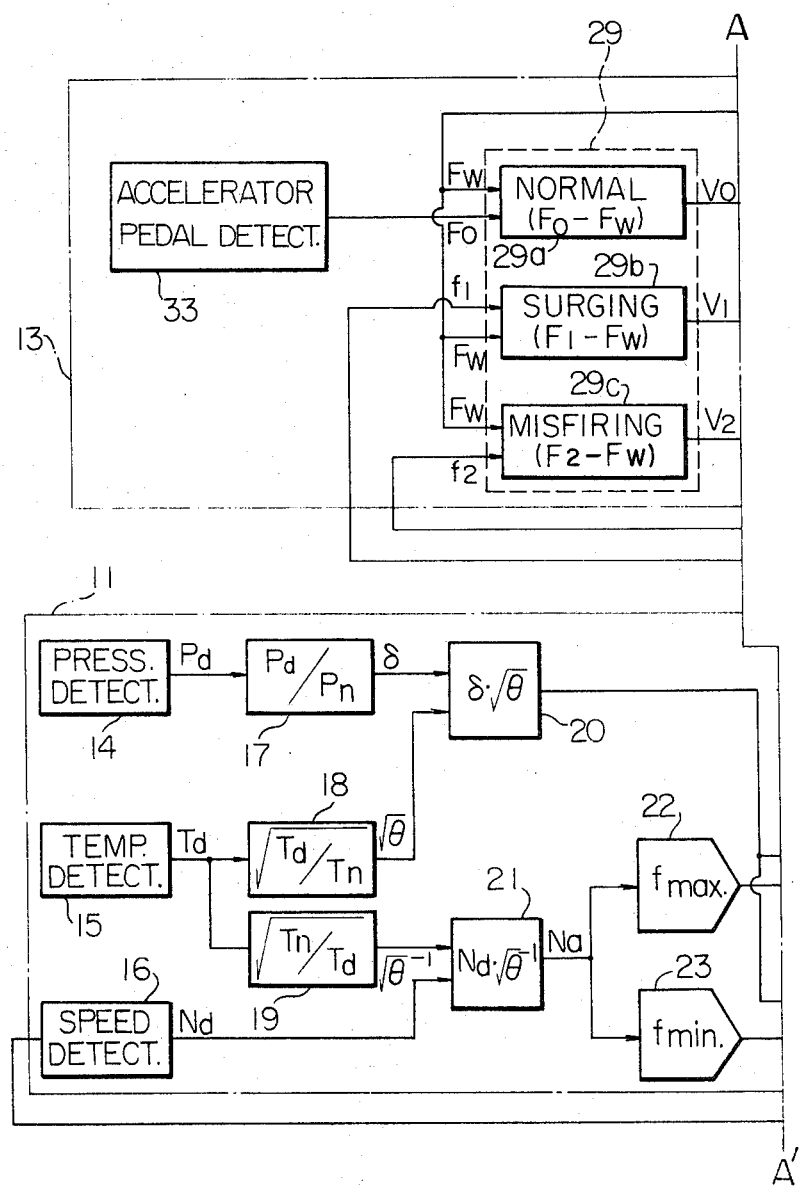
Figure 2B:
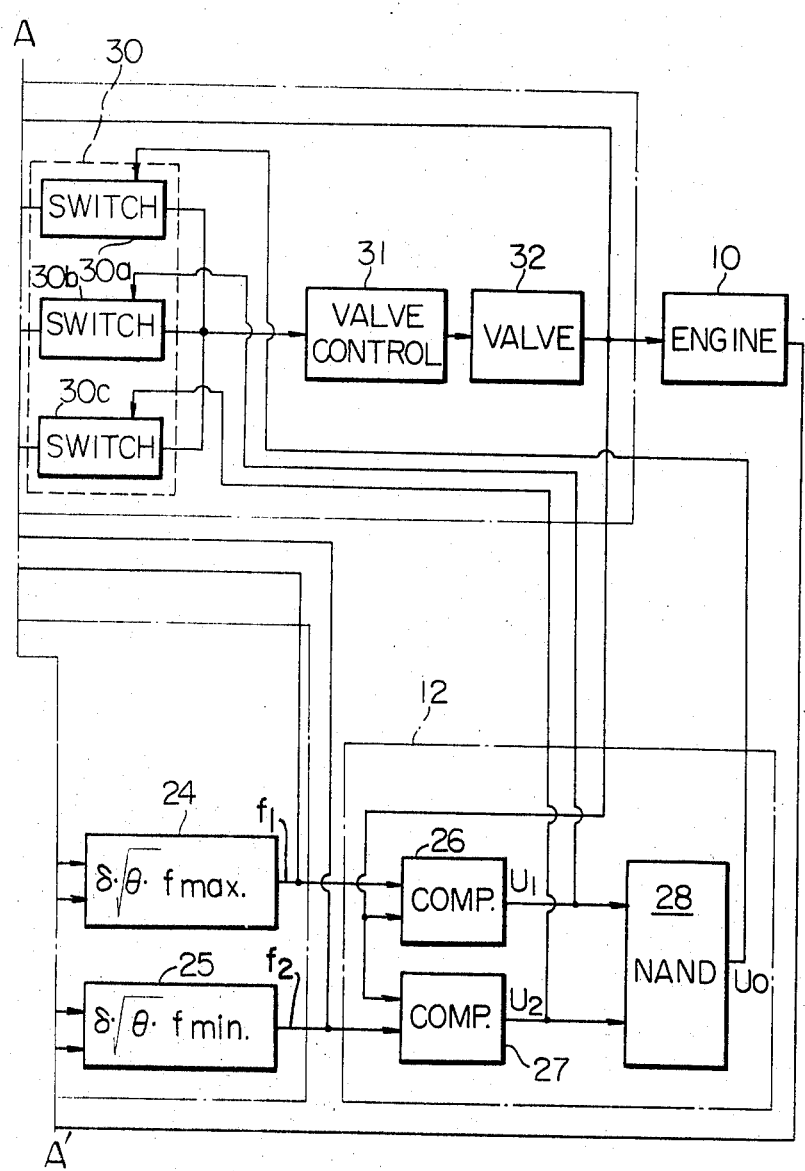
Figure 3:
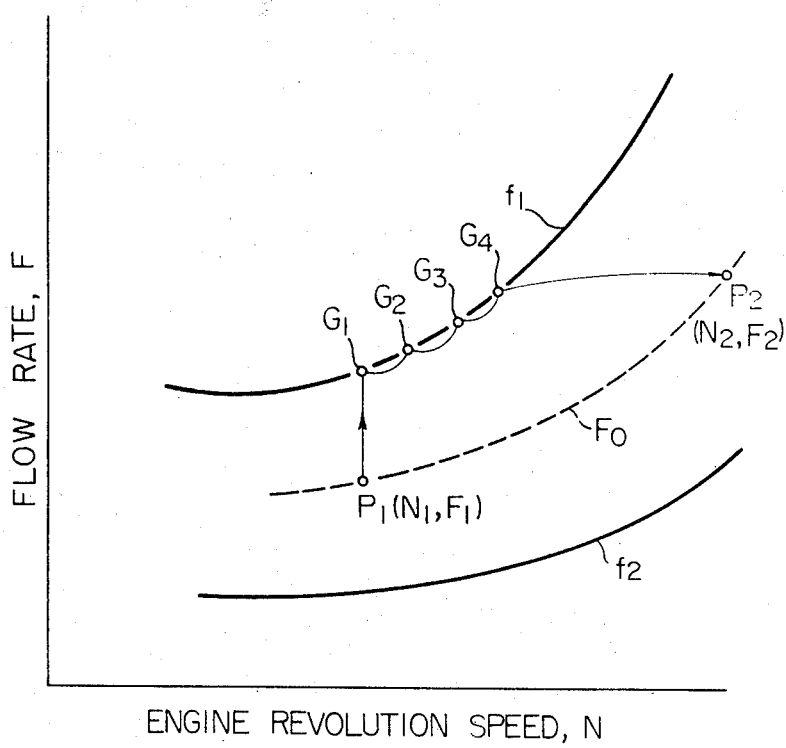

In the drawings:

FIG. 1 is a graphic representation of the normal, misfiring and surging ranges of a typical gas turbine engine, the ranges being indicated in terms of a corrected fuel flow rate and a corrected engine revolution speed;

FIG. 2 comprising FIG. 2a and FIG. 2b is a block diagram showing an electric arrangement for carrying out the method according to this invention; and FIG. 3 is a graphic representation of the range of the fuel flow rate to the engine, regulated by the arrangement of FIG. 2.

As previously outlined, the performance of a gas turbine engine varies depending upon the variations in the atmospheric pressure and temperature and the revolution speed of the engine. If the engine is supplied with excess fuel for its revolution speed at given atmospheric pressure and temperature, surging will take place in the engine and if, conversely, the engine receives insufficient fuel, then misfiring will be invited. To enable the gas turbine engine to operate in satisfactory conditions under varying engine and atmospheric conditions, it is important that the flow rate of the fuel to the engine be regulated in accordance with the revolution speed of the engine and the pressure and temperature of the atmospheric air surrounding the engine continuously at every instant.

FIG. 1 shows curves indicating upper and lower limits $f_{max.}$ and $f_{min.}$, respectively, of a range of a corrected fuel flow rate $F_a$ at a corrected engine revolution speed $N_a$, within which range the engine operates in proper conditions, namely, in conditions free from surging and misfiring. When the adjusted ful flow rate $F_a$ is higher than the upper limit $f_{max.}$ of such range at a given corrected engine revolution speed $N_a$, then the engine causes surging as indicated by region A in FIG. 1. The region denoted by B as defined by the curves $f_{max.}$ and $f_{min.}$ indicates the range in which the engine operates in sound or "normal" conditions with the corrected fuel flow rate within an acceptable range. If the corrected fuel flow rate $F_a$ at a given corrected engine revolution speed $N_a$ is lower than the lower limit $f_{min.}$ of range B, then misfiring takes place in the engine as indicated by region C. The regions A, B and C defined by curves $f_{max.}$ and $f_{min.}$ thus represent the surging, normally operating and misfiring ranges, respectively, of the engine in terms of the corrected fuel flow rate $F_a$ and the corrected engine revolution speed $N_a$. It will be observed from FIG. 1 that the engine is free from surging and misfiring if the corrected fuel flow rate $F_a$ is lower than $f_{max.}$ and higher than $f_{min.}$.

Now, the corrected engine revolution speed $N_a$ and the corrected fuel flow rate $F_a$ which are used as important operational indices in the arrangement according to this invention are derived from a detected engine revolution speed $N_d$ and a detected working fuel flow rate $F_w$, respectively, and are defined as follows:

$$N_a = \sqrt{\theta}^{-1} \times N_d \qquad \text{Eq. 1}$$
$$F_a = \sqrt{\theta} \times \delta F_w \qquad \text{Eq. 2}$$

where $\theta = T_d/T_n$ and $\delta = P_d/P_n$ in which:

$T_d$: detected atmospheric temperature,
$T_n$: normal atmospheric temperature (which is usually 288°K),
$P_d$: detected atmospheric pressure, and
$P_n$: normal atmospheric pressure (which is usually 1,033 grams/cm$^2$).

Thus, according to this invention, the working flow rate $F_w$ of the fuel to the engine is regulated so that the following relation holds for any engine revolution speed and for any atmospheric pressure and temperature:

$$f_{min.} < F_a < f_{max.}$$

The flow rate $F_a$ justifying this relation is further regulated so as to approach a desired working fuel flow rate $F_o$ which is pertinent for the selected position of the accelerator pedal.

A preferred example of electrical arrangements which are adapted to regulate the working fuel flow rate to the gas turbine engine in compliance with the above discussed principles is now described with reference to FIG. 2:

The electrical arrangement is used in combination with a gas turbine engine which is generally designated by reference numeral 10 and which is constructed and operated in a usual manner. The electrical arrangement includes means 11 which is adapted to produce signals representing upper and lower limits $f_1$ and $f_2$, respectively, of an acceptable range of the working fuel flow rate as determined in accordance with the corrected fuel flow rate $F_a$ and the corrected engine revolution speed $N_a$. The means 11 is connected to means 12 to which the signals produced by the means 11 are supplied. The means 12 receives not only the signals produced by the means 11 but a signal $F_w$ representing a working flow rate of the fuel supplied to the engine 10 so as to compare the former two signals $f_1$, $f_2$ with the latter one. If the signal representing the working fuel flow rate $F_w$ is higher than the signal representing the upper limit $f_1$ or lower than the signal representing the lower limit $f_2$ of the acceptable flow rate range, then a digital signal $U_1$ or $U_2$ is produced to respectively indicate that the working fuel flow rate is either excessive or insufficient for the corrected fuel flow rate $F_a$ and corrected engine revolution speed $N_a$, viz., the engine 10 is operating under the conditions falling within the range A or C of FIG. 1. If, on the other hand, the signal representing the working fuel flow rate $F_w$ lies between the upper and lower limits of the acceptable range, then another digital signal $U_o$ is produced by the means 12 indicating that the engine is operating under the conditions falling within the range B.

The means 11 and 12 are connected to means 13 which is adapted to regulate the working fuel flow rate $F_w$ of the fuel to the engine 10 in accordance with the signals which are produced by the means 11 and 12. The signals representing the upper and lower limits $f_1$ and $f_2$, respectively, of the acceptable flow rate range as produced by the means 11 are supplied to the means 13 so that, if the working fuel flow rate $F_w$ is higher than the upper limit or lower than the lower limit, then a signal $V_1$ or $V_2$ is produced which represents a difference between the detected working fuel flow rate and the upper or lower limit of the acceptable range. If, conversely, the working fuel flow rate $F_w$ is lower than the upper limit and higher than the lower limit, then a signal is produced representing a difference between the working fuel flow rate and a desired fuel flow rate $F_o$ which is determined by a selected position of an accelerator pedal (not shown). The selective delivery of the output signal from the means 13 is effected by means of the signal supplied from the means 12 so that, if the working fuel flow rate $F_w$ is not within the acceptable range, then the flow rate is regulated in a manner to reduce the difference between the detected working fuel flow rate and the upper or lower limit of the acceptable range until such difference is eliminated and that, if the detected flow rate falls within the acceptable flow rate range, then the flow rate is regulated so as to approach the desired working fuel flow rate $F_o$ determined by the selected accelerator pedal position.

The electrical arrangement providing the above described operation will be put into practice in various manners and it should be noted that the practical construction which is illustrated in detail in FIGS. 2a and 2b is only a preferred example of the constructions adapted to carry out the method according to this invention.

Now, the means 11 which is intended to produce two signals representing the upper and lower limits of the acceptable range of the working fuel flow rates includes detecting means 14, 15 and 16 for detecting an atmospheric pressure $P_d$, an atmospheric temperature $T_d$ and a revolution speed $N_d$ of the engine 10 respectively and producing signal voltages which are substantially proportional to the detected quantities.

The pressure detecting means 14 is connected to a voltage divider 17 and the signal voltage representing the detected atmoshperic pressure $P_d$ is supplied thereto. The input voltage to the divider 17 is divided by a voltage representing a predetermined normal atmospheric pressure $P_n$ so that a signal voltage representing a ratio of the detected atmospheric pressure $P_d$ versus the normal atmospheric pressure $P_n$ issues from the voltage divider 17, this ratio corresponding to the value $\delta$ in Equation 1.

This temperature detecting means 15 is connected to two parallel voltage dividers 18 and 19 and the signal voltage representing the detected atmospheric pressure temperature $T_d$ is supplied thereto. The voltage divider 18 produces a signal voltage representing the square root of the ratio of the detected atmospheric temperature $T_d$ versus the normal atmospheric temperature $T_n$, while the voltage divider 19 produces a signal voltage representing the reciprocal of such square root of this particular ratio. Thus, the signal voltages produced by the voltage dividers 18 and 19 stand for the values expressed as:

$$\sqrt{\theta} = \sqrt{T_d/T_n} \text{ and } \sqrt{\theta^{-1}} = \sqrt{T_n/T_d}$$

The voltage deviders 17 and 18 are connected to a common multiplier 20 whereby a signal representing the product of the signal voltages supplied from the two voltage dividers 17 and 18 is produced. The output signal voltage of the multiplier 20 thus stands for $\delta \cdot \sqrt{\theta}$ of Equation 2.

The engine revolution speed detector 16, which may be a tachometric generator connected to an output shaft (not shown) of the engine 10, produces a signal voltage which is substantially proportional to the detected eingine revolution speed $N_d$. This engine revolution seed detector 16 and the voltage divider 19 are connected to a common multiplier 21 whereby the signal voltages representing the detected engine revolution speed $N_d$ and the value $\sqrt{\theta^{-1}}$ are multiplied by each other into a product $N_d \cdot \sqrt{\theta^{-1}}$. The multiplier 21 thus produces a signal voltage representing a corrected engine revolution speed $N_a = N_d \cdot \sqrt{\theta^{-1}}$ which corresponds to Equation 1.

The multiplier 21 is connected to two function generators 22 and 23 for producing signal voltages respectively representing the upper and lower limits $f_{max.}$ and $f_{min.}$ of the acceptable range of a corrected working flow rate $F_a$ at the adjusted engine revolution speed $N_a$. The function generators 22 and 23 are connected respectively to multipliers 24 and 25 to both of which the multiplier 20 is also connected. The multiplier 24 connected to the multiplier 20 and the function generator 22 thus produces a signal voltage $f_1$ which represents the product of the values $\delta \cdot \sqrt{\theta}$ and $f_{max.}$ while the multiplier 25 connected to the multiplier 20 and the function generator 23 produces a signal voltage $f_2$ which represents the product of the values $\delta \cdot \sqrt{\theta}$ and $f_{min.}$. The signals $f_1$ and $f_2$ produced in this manner are then supplied to both of the means 12 and 13 as previously discussed.

The means 12 is shown to comprise two comparators 26 and 27 which are connected to the multipliers 24 and 25, respectively, of the means 11 and a NAND circuit 28 which is connected to the comparators 26 and 27. The comparators 26 and 27 receive not only the output signal voltages of the respective multipliers 24 and 25 but a signal representing a workign fuel flow rate $F_w$ of the fuel to the engine 10. The signal voltage representing the working fuel flow rate $F_w$ is thus compared with the signal voltages $f_1$ and $f_2$ delivered from the multipliers 24 and 25, respectively so that, if the former signal voltage is higher than or equal to the signal voltage $f_1$ or lower than or equal to the signal voltage $f_1$, then a digital signal $U_1$ or $U_2$ is produced from the comparator 26 or 27, respectively. The NAND circuit 28 is responsive to the digital signals $U_1$ and $U_2$ and produces a digital signal $U_o$ in the concurrent absence of these signals, viz., when the working fuel flow rate $F_w$ lies within the acceptable range of the fuel flow rate.

The means 13 comprises, by way of example, flow regulating signal generating means 29, switching means 30 connected to the signal generating means 29, valve control means 31 connected to the switching means 30 and fuel flow regulating valve means 32 connected electrically to the valve control means 31 and mechanically to the engine 10.

The flow regulating signal generating means 29 comprises a normal flow signal generator 29a, a surge preventive signal generator 29b and a misfire preventive signal generator 29c. The normal flow signal generator 29a is connected to means 33 for detecting a selected position of an accelerator pedal (not shown) so as to produce a signal voltage representing a desired working fuel flow rate $F_o$ which is dictated by the detected position of the accelerator pedal. The normal flow signal generator 29a is supplied with not only the signal voltage corresponding to the desired flow rate $F_o$ but the signal representing the working fuel flow rate $F_w$ and produces a signal voltage which is proportional to a value $F_o - F_w$.

The surge preventive and misfire preventive signal generators 29b and 29c, respectively, are connected to the multipliers 24 and 25 of the means 11 and receive signal voltages $f_1$ and $f_2$ representing the upper and lower limits of the acceptable flow rate at the corrected engine revolution speed $N_a$, respectively. The signal generators 29b and 29c also receive the signal representing the working fuel flow rate $F_w$ so as to produce output signal voltages which are proportional to values $f_1 - F_w$ (where $f_1 \leq F_w$) and $f_2 - F_w$ (where $F_w \leq f_2$).

The signal generators 29a, 29b and 29c are connected to switches 30a, 30b and 30c, respectively. These switches 30a, 30b and 30c are connected to the NAND circuit 28, comparator 26 and comparator 27 and thus receive digital signals $U_o$, $U_1$ and $U_2$, respectively. The switch 30a is adapted to be closed when the digital signal $U_o$ is supplied from the NAND circuit 28, viz., the working flow rate $F_w$ is lower than or equal to the upper limit and higher than or equal to the lower limit of the acceptable flow rate range at the corrected engine revolution speed. The switch 30b or 30c is closed when supplied with the signal $U_1$ or $U_2$ from the comparator 26 or 27, viz., the working fuel flow rate $F_w$ is higher than or equal to the upper limit or lower than or equal to the lower limit of the acceptable flow rate range, respectively. It will thus be understood that only one of the three switches is closed depending upon the flow rate of the fuel to the engine. These switches may preferably be relay or electronically operating switches capable of quickly responding to supplied signals so that the selective the switches can be opened and closed minutely and continually.

The switches 30a, 30b and 30c are connected to the valve control means 31 which is adapted to control the flow regulating valve means 32 in accordance with the control signal voltage supplied from any of the signal generators 29a, 29b and 29c through the associated switch.

In the arrangement shown in FIG. 2, the signal which represent the working fuel flow rate $F_w$ is detected from the flow of the fuel regulated by the valve means 32.

When, in operation, the working fuel flow rate $F_w$ is higher than or equal to the upper limit $f_1$ of the acceptable flow rate range at the corrected engine revolution speed $N_a$ so that surging is invited in the engine, the comparator 26 produces its digital signal $U_1$ to close the switch 30b and at the same time the surge preventive signal generator 29b produces the signal voltage $V_1$ which corresponds to the value $f_1 - F_w$, where $F_w$ is greater than or equal to $f_1$. The signal voltage $V_1$ is passed to the valve control means 31 through the closed switch 30b whereby the valve means 32 is controlled to decrease the working fuel flow rate $F_w$ until the varying value $V_1 = f_1 - F_w$ becomes zero. The working fuel flow rate $F_w$ thus becoming equal to the upper limit $f_1$ of the acceptable flow rate range, the digital signal $U_1$ from the comparator 26 is absent and, with the comparator 27 inoperative to produce its signal $U_2$, the NAND circuit 28 supplies the digital signal $U_o$ to close the switch 30a.

When, conversely, the working fuel flow rate $F_w$ is lower than or equal to the lower limit $f_2$ of the acceptable flow rate at the corrected engine revolution speed $N_a$ and accordingly the engine causes misfiring, then the comparator 27 produces its digital signal $U_2$ so as to close the switch 30c and simultaneously the misfire preventive signal generator 29c produces the signal voltage $V_2$ which is in correspondence with the value $f_2 - F_w$ where $F_w$ is smaller or equal to $f_2$. The signal voltage $V_2$ is supplied to the valve control means 31 through the closed switch 30c with the result that the valve means 32 is controlled in a manner to increase the working fuel flow rate $F_w$ until the value $V_2 = f_2 - F_w$ becomes zero. As soon as the working fuel flow rate $F_w$ reaches the lower limit $f_2$ of the acceptable flow rate range, the comparator 27 is unable to produce the digital signal $U_2$. Since, at this instant, the digital signal $U_1$ is absent, the signal $U_o$ is produced by the NAND circuit 28 so that the switch 30a is now closed.

The improper working fuel flow rate is corrected in this manner whereby the engine is prevented from surging and misfiring that may otherwise result therefrom. According to this invention, the working fuel flow rate $F_w$ which is thus maintained within the acceptable flow rate range is further regulated so as to approach the desired working fuel flow rate $F_o$ which is determined by the selected position of the accelerator pedal, as previously mentioned.

The operation of the normal flow signal generator 29a of the flow regulating signal generating means 29 will now be described with reference to FIG. 3.

If the accelerator pedal, which has been in a position to require a desired fuel flow rate $F_1$ with the engine operating at a revolution speed of $N_1$, as indicated at point $P_1$ in FIG. 3 is opened wider to a position in which the desired fuel flow rate is $F_2$ corresponding to the engine speed of $N_2$ as indicated at point $P_2$, then the flow regulating valve means 32 is opened wider with the switch 30a closed so that the working fuel flow rate F rises from $F_1$ to $G_1$ which is the upper limit of the acceptable flow rate range at the engine revolution speed $N_1$. At this instant, the switch 30a opens and instead the switch 30b closes to enable the signal voltage from the surge preventive signal generator 29b to be passed over to the valve control means 31 through the switch 30b. Since, however, the working flow rate $F_w$ is exactly equal to the upper limit of the flow rate range at this very moment, the signal voltage $V_1$ is zero with the result that the valve means 32 is held at rest. Under this condition, the engine revolution speed rises from $N_1$ because the desired fuel flow rate has been raised from $F_1$ to $F_2$ with the accelerator pedal opened wider. The engine revolution speed thus becomes higher than $N_1$ and accordingly the upper limit $f_1$ increases. The switch 30b therefore re-opens and the switch 30a closes to cause the valve means 32 to open wider until the working fuel flow rate $F_w$ reaches a higher upper limit $G_2$ of the acceptable flow rate range. The engine still continues increasing its revolution speed and the working flow rate $F_w$ rises from $G_2$ to $G_3$, $G_4$, . . . until it reaches $F_2$ which is optimum for the selected position of the acelerator at the engine revolution speed $N_2$. The above discussion has dealt with a case where the accelerator pedal is opened considerably wider and it may be mentioned that, where the accelerator pedal is opened only slightly wider, the switch 30a will remain closed so as to cause the working fuel flow rate to reach the level $F_2$ only by means of the signal voltage $V_o$.

Where the accelerator pedal is moved toward its closed condition, the working fuel flow rate will be reduced under the limitation of the lower limit $f_2$ of the acceptable flow rate range, essentially similarly to the case above discussed.

The variation of the working fuel flow rate from one point to the other such as through the points $G_1$, $G_2$, $G_3$, $G_4$, . . . will be effected sufficiently minutely and continually if relay type or electronically operating switches which are quickly responsive to the supplied signals are used for the switching means 30.

The arrangement shown in FIG. 2 is preferred to be used for carrying out the method according to this invention for the following advantages:

a. Reliable switching action of the switch means 30 owing to the use of the digital signals for controlling the individual switches.

b. The working fuel flow rate and the upper and lower limits of the acceptable flow rate range at a given engine revolution speed can be monitored readily because such flow rate is compared before the signal $U_1$ or $U_2$ is issued.

c. In case the working flow rate becomes outside acceptable flow rate range due to unforeseen external disturbances so as to invite surging or misfiring in the engine, then one of the digital signals $U_1$ or $U_2$ is produced immediately to cause the switch 30b or 30c to open until the proper flow rate is resumed.

The method according to this invention arranged as hereinbefore described are thus expected to contributing to maintaining the gas turbine engine at all times in satisfactory conditions and to improving the engine combustion efficiency significantly so as to solve vehicular air pollution problems.

What is claimed is:

1. In a gas turbine engine having a fuel flow regulating valve means for regulating the working fuel flow rate of said engine, a method for controlling said valve means comprising comparing said working fuel flow rate with upper and lower limits of an acceptable range of working fuel flow rates determined in dependence upon the existing atmospheric pressure, temperature and the revolution speed of said engine, producing an appropriate digital signal representing that said flow rate is higher or lower than or within said acceptable range, and supplying a control signal to said valve means in accordance with said digital signal for moving the valve means to adjust said flow rate to enter into said acceptable range if the flow rate is higher or lower than said acceptable range or to approach a desired working fuel flow rate determined by the position of an accelerator pedal if the flow rate is otherwise within said acceptable range.

2. In a gas turbine engine having a fuel flow regulating valve means for regulating the working fuel flow rate to said engine a method for controlling said valve means in accordance with detected atmospheric pressure and temperature and a detected revolution speed of said engine, which method comprises producing a first signal substantially proportional to the working fuel flow rate regulated by said valve means, producing second and third signals respectively representing upper and lower limits of an acceptable range of fuel flow rates which is determined from the working fuel flow rate corrected in dependence upon said detected atmospheric pressure and temperature and the engine revolution speed corrected in dependence upon said detected atmospheric temperature, comparing said first signal with said second and third signals for producing a fourth or fifth signal when said first signal is higher than said second signal or lower than said third signal, respectively, producing a sixth signal in the concurrent absence of the fourth and fifth signals, producing a seventh signal which is substantially proportional to a desired working fuel flow rate for a selected position of an accelerator pedal, and producing an eighth or ninth signal representing a difference between said first and second or first and third signals respectively when said first signal is higher than said second signal or lower than said third signal for controlling said valve means to respectively reduce or increase the working fuel flow rate until said difference is eliminated or producing a tenth signal representing a difference between said first and seventh signal when said first signal is lower than said second signal and higher than said third signal for controlling said valve means to regulate the working fuel flow rate until the flow rate reaches said desired working fuel flow rate.

3. A method according to claim 2, wherein the corrected working fuel flow rate is determined as $\sqrt{\theta} \times \delta \times F_w$ where $\theta$ is a ratio of said detected atmospheric temperature versus a predetermined normal atmospheric temperature, $\delta$ is a ratio of said detected atmospheric pressure versus a predetermined normal atmospheric pressure and $F_w$ is the detected working fuel flow rate.

* * * * *